US012776450B2

(12) United States Patent
Matsushita

(10) Patent No.: US 12,776,450 B2
(45) Date of Patent: Oct. 27, 2026

(54) ELECTRONIC COMPONENT

(71) Applicant: Murata Manufacturing Co., Ltd., Kyoto-fu (JP)

(72) Inventor: Yosuke Matsushita, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 97 days.

(21) Appl. No.: 18/652,121

(22) Filed: May 1, 2024

(65) Prior Publication Data

US 2024/0282528 A1 Aug. 22, 2024

Related U.S. Application Data

(63) Continuation of application No. PCT/JP2022/036924, filed on Oct. 3, 2022.

(30) Foreign Application Priority Data

Nov. 11, 2021 (JP) ................................ 2021-184314

(51) Int. Cl.

*H01G 4/228* (2006.01)
*H01G 4/005* (2006.01)
*H01G 4/30* (2006.01)

(52) U.S. Cl.

CPC ............ *H01G 4/228* (2013.01); *H01G 4/005* (2013.01); *H01G 4/30* (2013.01)

(58) Field of Classification Search

CPC .......... H01G 4/30; H01G 4/228; H01G 4/232; H01G 4/248; H01G 4/005
USPC ..................... 361/301.4, 306.3, 321.1, 321.3
See application file for complete search history.

(56) References Cited

U.S. PATENT DOCUMENTS 6,001,537 A 12/1999 Ohsumi et al.
9,842,700 B2 * 12/2017 Ikeda .................... H01G 4/012
2013/0330509 A1 * 12/2013 Otsubo .................. B32B 18/00 156/89.12
2016/0165720 A1 6/2016 Nishino et al.
2016/0242294 A1 8/2016 Yanagida
2016/0372255 A1 * 12/2016 Maki .................... H01F 41/041
(Continued)

FOREIGN PATENT DOCUMENTS

JP 2001-093770 A 4/2001
JP 3224731 B2 11/2001
(Continued)

OTHER PUBLICATIONS

International Search Report for PCT/JP2022/036924 dated Dec. 20, 2022.

*Primary Examiner* — Arun Ramaswamy
(74) *Attorney, Agent, or Firm* — McDonald Hopkins LLC

(57) ABSTRACT

An electronic component includes a body having a first surface, a base electrode disposed on the first surface, and a plating film covering the base electrode. The first surface has a reference plane and a recess more recessed than the reference plane. The base electrode is disposed inside the recess so as not to more protrude than the reference plane. A surface of the plating film that is farthest from the body is flush with the reference plane or is located at a position more protruding than the reference plane. When viewed from a direction perpendicular to the first surface, the base electrode is disposed inside the recess and spaced apart from an outer periphery of the recess.

12 Claims, 8 Drawing Sheets

(56) References Cited

U.S. PATENT DOCUMENTS

| | | | | |
|---|---|---|---|---|
| 2017/0362079 | A1 | 12/2017 | Konno et al. | |
| 2018/0027658 | A1 * | 1/2018 | Choi | H05K 1/181<br>174/260 |
| 2018/0053715 | A1 | 2/2018 | Ishihara et al. | |
| 2019/0214187 | A1 * | 7/2019 | Imada | H01F 17/0013 |
| 2020/0082986 | A1 | 3/2020 | Yaso | |
| 2022/0189683 | A1 * | 6/2022 | Shiga | H01F 27/292 |
| 2023/0343516 | A1 * | 10/2023 | Oie | H01G 4/224 |

FOREIGN PATENT DOCUMENTS

| | | | |
|---|---|---|---|
| JP | 2012-119533 | A | 6/2012 |
| JP | 2015-201514 | A | 11/2015 |
| JP | 2018-032657 | A | 3/2018 |
| JP | 6533066 | B2 | 6/2019 |
| WO | 2012/121141 | A1 | 9/2012 |
| WO | 2015/129600 | A1 | 9/2015 |
| WO | 2016/117203 | A1 | 7/2016 |
| WO | 2017/199734 | A1 | 11/2017 |
| WO | 2018/216452 | A1 | 11/2018 |

* cited by examiner

ELECTRONIC COMPONENT

CROSS REFERENCE TO RELATED APPLICATION

This is a continuation of International Application No. PCT/JP2022/036924 filed on Oct. 3, 2022 which claims priority from Japanese Patent Application No. 2021-184314 filed on Nov. 11, 2021. The contents of these applications are incorporated herein by reference in their entireties.

BACKGROUND OF THE DISCLOSURE

Field of the Disclosure

The present disclosure relates to an electronic component.

Description of the Related Art

International Publication No. 2017/199734A1 (PTL 1) discloses a stack-type electronic component. In PTL 1, a low-pass filter as an example of a stack-type filter is formed by stacking a plurality of dielectric layers. The electronic component has a lower surface on which input and output terminals and a ground electrode are formed as a plurality of electrodes. A plating film may be applied to the surfaces of these electrodes.

PTL 1: International Publication No. 2017/199734A1

BRIEF SUMMARY OF THE DISCLOSURE

In order to obtain an electrode to which a plating film is applied, a base electrode is first disposed on a surface of a dielectric layer, and then subjected to a plating treatment. When the surface of the base electrode is flush with the surface of the dielectric body, a plating treatment produces a portion protruding from the surface of the dielectric body by the thickness of the plating film. When this electrode is soldered and the electronic component is mounted thereon, due to the electrode having a protrusion, an extra space remains around the electrode. The "extra space" herein means a gap existing outside the electronic component. In general, while reduction in profile of products has been demanded, the design area inside each product has been significantly reduced. As the products themselves have recently been reduced in thickness, the volume of such an extra space appearing around the mounted electrode cannot be negligible.

Thus, a possible benefit of the present disclosure is to provide an electronic component in which, in the state after the electronic component is mounted, an extra space remaining around an electrode used for mounting the electronic component can be eliminated as much as possible, to thereby increase a volume of a portion available for design inside the electronic component.

In order to achieve the above-described possible benefit, an electronic component based on the present disclosure includes: a body having a first surface; a base electrode disposed on the first surface; and a plating film covering the base electrode. The first surface has a reference plane and a recess more recessed than the reference plane. The base electrode is disposed inside the recess so as not to more protrude than the reference plane. A surface of the plating film that is farthest from the body is flush with the reference plane or located at a position more protruding than the reference plane. When viewed from a direction perpendicular to the first surface, the base electrode is disposed inside the recess and spaced apart from an outer periphery of the recess.

According to the present disclosure, in the state after the electronic component is mounted, an extra space remaining around an electrode used for mounting the electronic component can be eliminated as much as possible, to thereby increase the volume of a portion available for design inside the electronic component.

DETAILED DESCRIPTION OF THE DISCLOSURE

The dimension ratio shown in the accompanying drawings does not always faithfully show the actual dimension ratio, but the dimension ratio may be exaggerated for the sake of explanation. In the following description, mentioning the concept "upper" or "lower" does not necessarily indicate an absolute upper or lower position, but may indicate a relatively upper or lower position in the posture shown in each figure.

First Embodiment

Figure 1:
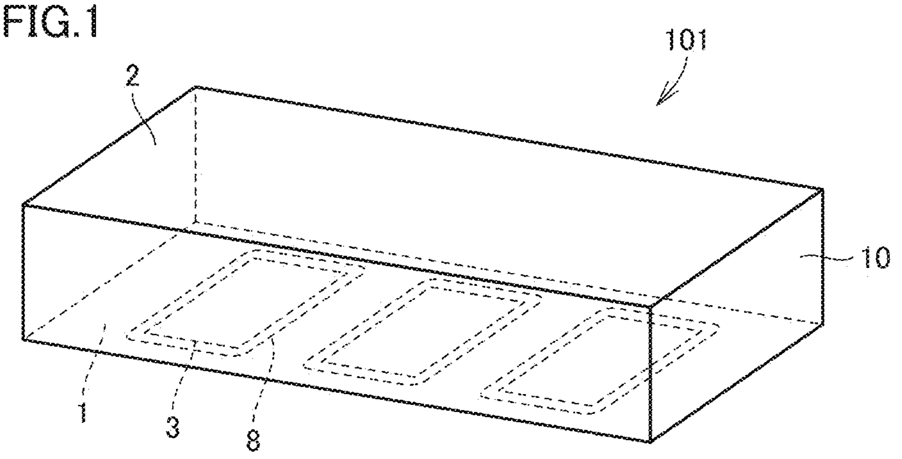
FIG. 1 is a first perspective view of an electronic component in a first embodiment based on the present disclosure.
Figure 2:
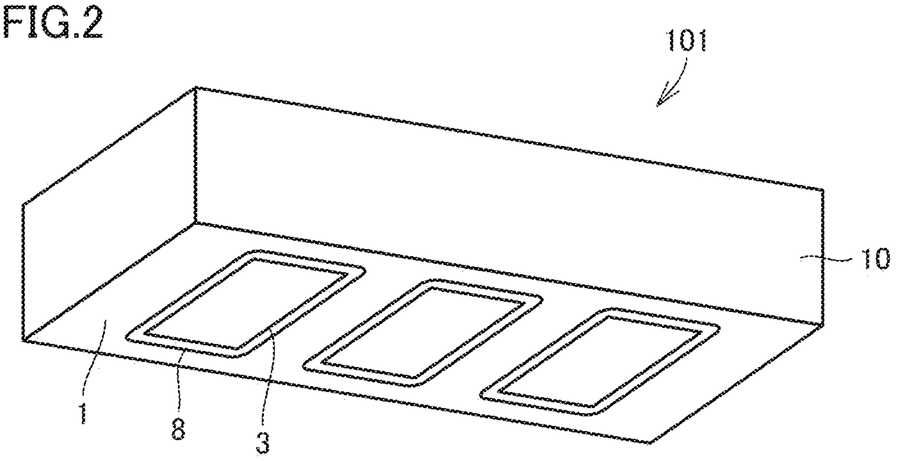
FIG. 2 is a second perspective view of the electronic component in the first embodiment based on the present disclosure.
Figure 3:
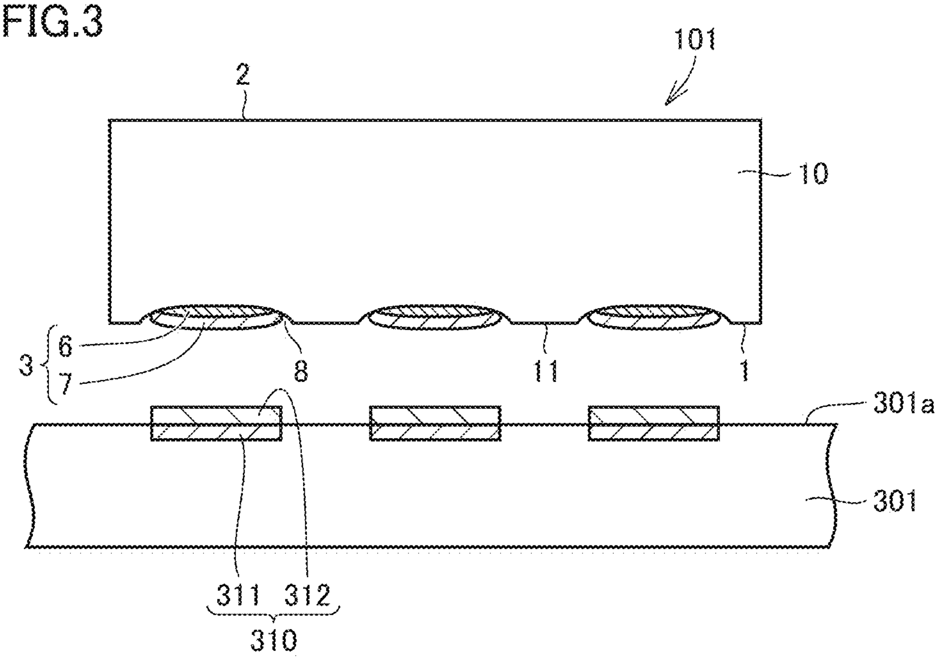
FIG. 3 is an explanatory diagram of a manner in which the electronic component in the first embodiment based on the present disclosure is to be mounted on a substrate.
Figure 4:
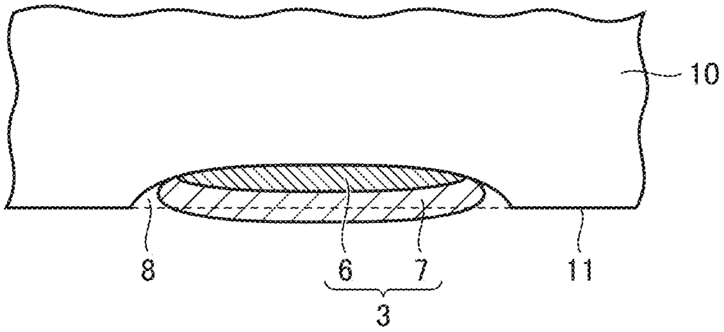
FIG. 4 is a partial enlarged cross-sectional view of the electronic component in the first embodiment based on the present disclosure.
Figure 5:
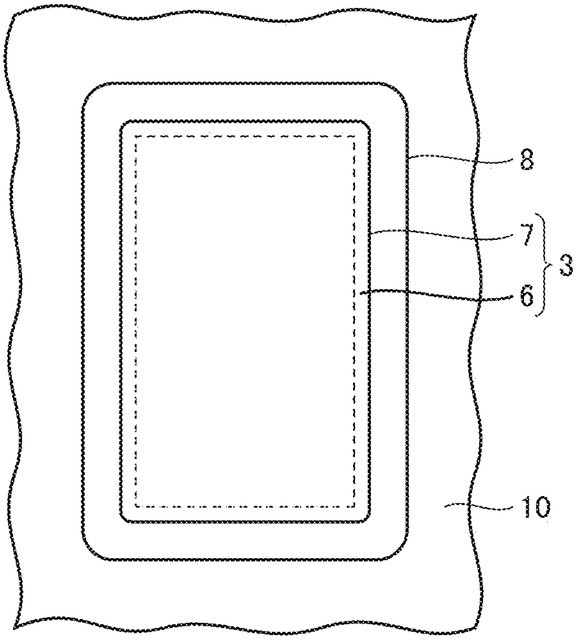
FIG. 5 is a partial enlarged bottom view of the electronic component in the first embodiment based on the present disclosure.
Figure 6:
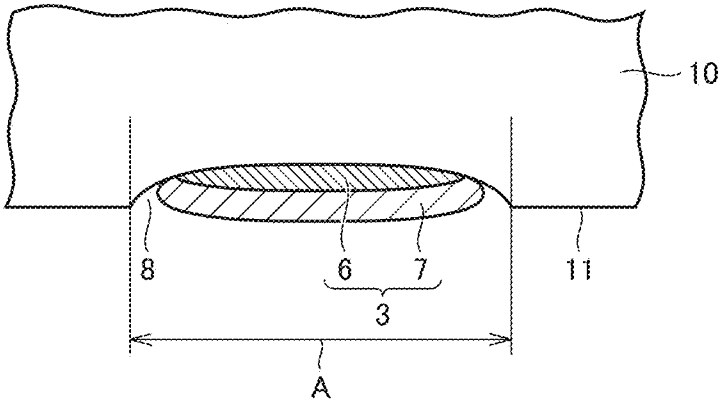
FIG. 6 is an explanatory diagram of a recess and its vicinity in the electronic component in the first embodiment based on the present disclosure.

Referring to FIGS. 1 to 7, an electronic component in the first embodiment based on the present disclosure will be hereinafter described. FIG. 1 shows a perspective view of an electronic component 101 in the present embodiment. FIG. 2 shows electronic component 101 viewed obliquely from below. Electronic component 101 has a first surface 1 and a second surface 2. In FIG. 1, first surface 1 is a lower surface and second surface 2 is an upper surface. A plurality of electrodes 3 are disposed on first surface 1. First surface 1 is provided with a plurality of recesses 8. Each of the plurality of electrodes 3 is disposed inside recess 8. FIG. 3 shows the manner in which electronic component 101 is to be mounted on a substrate 301. Substrate 301 has a surface 301*a*. An electrode 310 is disposed on surface 301*a*. Electrode 310 includes a base electrode 311 and a plating film 312 formed to cover base electrode 311. FIG. 4 shows an enlarged view of one electrode 3 and its vicinity in FIG. 3. FIG. 5 shows electrode 3 and its vicinity shown in FIG. 4 as viewed from directly below. In the present embodiment, as shown in FIG. 6, electrode 3 is completely accommodated in a region A corresponding to recess 8. Region A corresponds to a region shown as recess 8 in FIG. 5.

Electronic component 101 includes a body 10 having first surface 1, a base electrode 6 disposed on first surface 1, and a plating film 7 covering base electrode 6. First surface 1 has a reference plane 11 and recess 8 more recessed than reference plane 11. Base electrode 6 is disposed inside recess 8 so as not to protrude from reference plane 11. The surface of plating film 7 that is farthest from body 10 is flush with reference plane 11 or located at a position more protruding than reference plane 11. When viewed from the direction perpendicular to first surface 1, base electrode 6 is disposed inside recess 8 and spaced apart from an outer periphery of recess 8.

Figure 7:
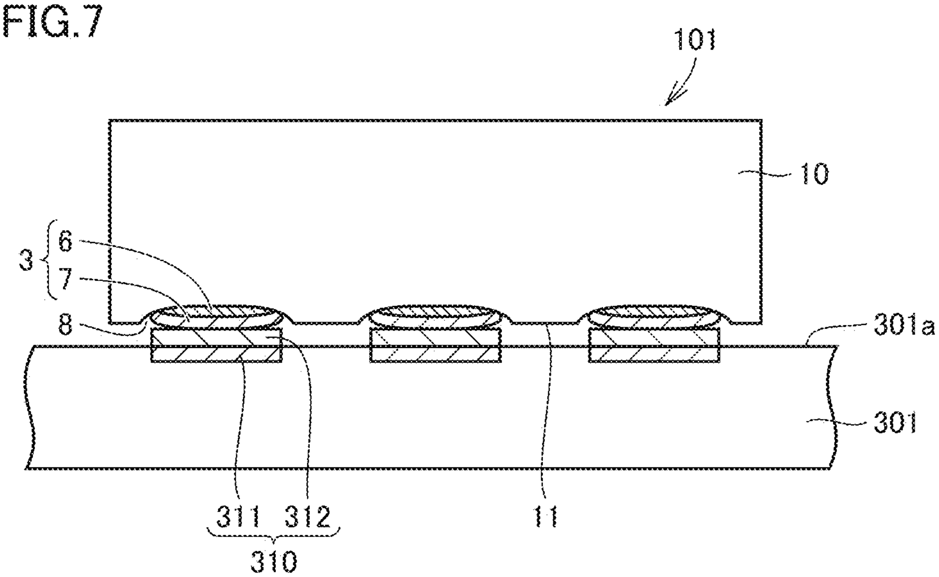
FIG. 7 is an explanatory diagram showing a state in which the electronic component in the first embodiment based on the present disclosure is mounted on the substrate.

FIG. 7 shows the state after electronic component 101 is mounted on surface 301*a* of substrate 301. Electrodes 3 and 310 are soldered to each other. FIG. 7 shows no solder.

In the present embodiment, as shown in FIG. 3, recess 8 exists around electrode 3, but a non-recessed region exists between electrodes 3 and a part of body 10 relatively protrudes in this non-recessed region. Thus, this relatively protruding portion can also be used for design as an inner part of body 10. In other words, in the present electronic component, in the state after this electronic component is mounted, an extra space remaining around the electrode used for mounting the electronic component can be eliminated as much as possible, to thereby increase the volume of the portion available for design inside the electronic component.

As shown in FIGS. 5 and 6, in a plan view, it is preferable that electrode 3 is completely accommodated together with plating film 7 inside recess 8. In particular, when viewed from the direction perpendicular to first surface 1, it is preferable that plating film 7 is disposed inside recess 8 and spaced apart from the outer periphery of recess 8.

As described in the present embodiment, the surface of base electrode 6 that is farther from body 10 is preferably flat or protrudes. By employing this configuration, even in the state after plating film 7 is grown so as to cover base electrode 6, the surface of plating film 7 that is farther from body 10 is flat or protrudes, which makes it possible to prevent the surface of plating film 7 from being recessed. If the surface of plating film 7 is recessed, plating film 7 may not completely come into close contact with the other electrode when the electronic component is mounted, and thereby a gap may be formed, which may decrease the bonding strength. Such a situation, however, can be avoided since the surface of plating film 7 can be prevented from being recessed.

In the example shown in FIG. 3, for example, recess 8 is provided at a position close to each of the left and right ends of first surface 1. When recess 8 is provided at a position close to the end of first surface 1, a remaining portion not corresponding to recess 8 in the region between recess 8 and the end of first surface 1 protuberates with a narrow width. In a portion where the remaining portion protuberates only with a narrow width to a certain degree or more, a crack tends to occur when barrel polishing is performed on body 10. For example, when the cross-sectional view shows a positional relation in which the cross-sectional curve of the inner surface of recess 8 overlaps with the cross-sectional curve of an R-shape formed by barrel polishing performed on body 10, a pointed shape is formed at a point as a vertex at which the cross-sectional curve of the inner surface of recess 8 and the cross-sectional curve of the R-shape formed by the barrel polishing intersect with each other, with the result that a crack is particularly more likely to occur.

Figure 8:
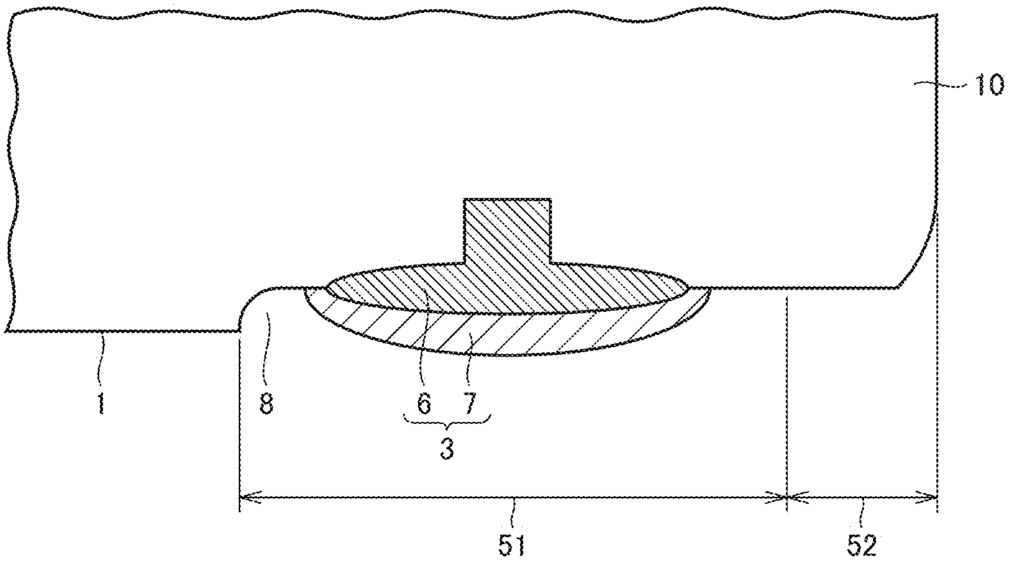
FIG. 8 is a partial enlarged cross-sectional view of a first modification of the electronic component in the first embodiment based on the present disclosure.

Thus, in order to avoid such occurrence of a crack, when recess 8 is located close to the end of first surface 1, a structure having recess 8 extending to the end of first surface 1 may be adopted as shown in FIG. 8. In other words, the recess may be formed to extend to the end of first surface 1. In FIG. 8, recess 8 is formed to extend to the end of first surface 1, and consequently, a protuberance as a remaining portion does not appear between recess 8 and the end of first surface 1. Such a configuration makes it possible to avoid occurrence of a local protuberance with a narrow width, with the result that the probability of occurrence of a crack can be reduced. FIG. 8 shows regions 51 and 52. Region 51 is a region in which recess 8 would have existed if recess 8 is not extended. Region 52 is a region in which an R-shape would have been formed by barrel polishing if recess 8 is not extended. In the example shown herein, regions 51 and 52 are in contact with each other without being spaced apart from each other. As shown in FIG. 8, recess 8 is formed to extend to the end of first surface 1, and consequently, recess 8 continuously extends to the inside of region 52.

Figure 9:
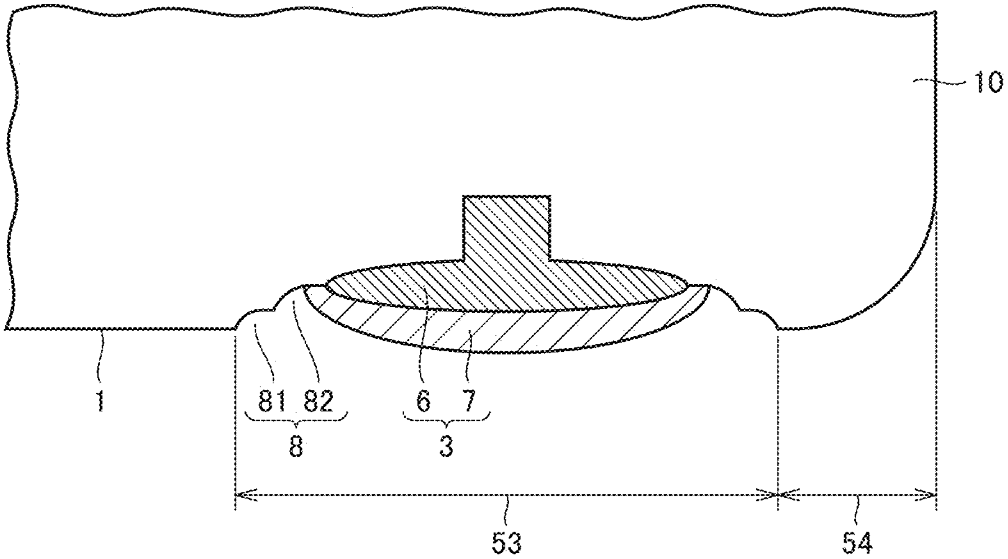
FIG. 9 is a partial enlarged cross-sectional view of a second modification of the electronic component in the first embodiment based on the present disclosure.

When the depth of recess 8 is large to some extent, recess 8 has an end that is sharply dug down. Thereby, a pointed shape is formed at the boundary between the region corresponding to recess 8 and the region not corresponding to recess 8, and accordingly, a crack tends to occur when barrel polishing is performed on body 10. Thus, in order to avoid such occurrence of a crack, it is conceivable to form recess 8 by digging down at two steps as shown in FIG. 9 instead of one step. In the example shown in FIG. 9, recess 8 has a shape formed by digging down at two steps. In other words, recess 8 includes portions 81 and 82. Portion 81 is formed as a recess at the first step by digging down from first surface 1. Portion 82 is formed as a recess at the second step by further digging down from the bottom of portion 81. Such a configuration makes it possible to prevent the end of recess 8 from having a sharply dug-down shape, with the result that the probability of occurrence of a crack can be reduced. FIG. 9 shows regions 53 and 54. Region 53 is a region in which recess 8 exists. Region 54 is a region in which an R-shape is formed by barrel polishing. In the example shown herein, regions 53 and 54 are in contact with each other without being spaced apart from each other.

Second Embodiment

Figure 10:
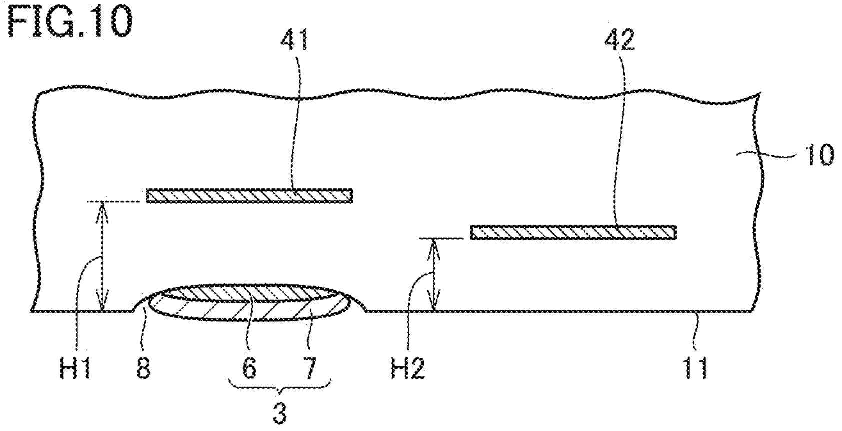
FIG. 10 is a partial cross-sectional view of an electronic component in a second embodiment based on the present disclosure.

Referring to FIG. 10, an electronic component in the second embodiment based on the present disclosure will be hereinafter described. The basic configuration of the electronic component in the present embodiment is the same as that of electronic component 101 described in the first embodiment, but the details are different. FIG. 10 shows a partial cross-sectional view of the electronic component in the present embodiment. FIG. 10 shows electrode 3 and its vicinity.

In the electronic component in the present embodiment, a first internal electrode 41 and a second internal electrode 42 are disposed inside body 10. At least a part of first internal electrode 41 is disposed inside a projection area of recess 8. Second internal electrode 42 is disposed outside the projection area of recess 8. Second internal electrode 42 is disposed closer to reference plane 11 than first internal electrode 41. Specifically, the distance between first internal electrode 41 and reference plane 11 is defined as H1, and the distance between second internal electrode 42 and reference plane 11 is defined as H2, in which case H1>H2. First internal electrode 41 and second internal electrode 42 are illustrated as being not electrically connected to each other, but they may be electrically connected to each other.

In the present embodiment, second internal electrode 42 is disposed at a position closer to reference plane 11 than first internal electrode 41, and thus, a larger number of portions inside body 10 can be effectively utilized for design.

Third Embodiment

Figure 11:
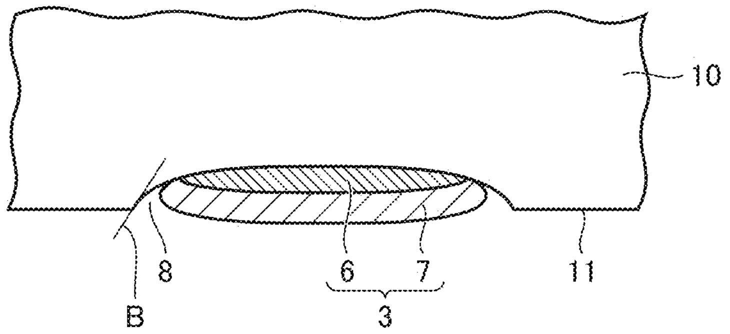
FIG. 11 is a partial cross-sectional view of an electronic component in a third embodiment based on the present disclosure.

Referring to FIG. 11, an electronic component in the third embodiment based on the present disclosure will be hereinafter described. The basic configuration of the electronic component in the present embodiment is the same as that of electronic component 101 described in the first embodiment. The features that may have already been provided in electronic component 101 will also be described again for the sake of further clarity. FIG. 11 shows a partial cross-sectional view of the electronic component in the present embodiment. FIG. 11 shows electrode 3 and its vicinity.

In the electronic component in the present embodiment, an outer edge portion of recess 8 is inclined with respect to reference plane 11. In a cross-sectional view, the inclination of the outer edge portion of recess 8 is indicated by a straight line B. Straight line B is inclined with respect to reference plane 11.

In the present embodiment, the outer edge portion of recess 8 is inclined with respect to reference plane 11. Thus, even if a foreign substance enters into a gap between the outer edge of recess 8 and electrode 3, the foreign substance smoothly moves out of the gap. Therefore, biting of the foreign substance at the outer edge portion of recess 8 can be prevented. Further, in the present embodiment, there is no steep step at the edge of recess 8, and thus, chipping or the like at the edge of recess 8 can be avoided.

Fourth Embodiment

Figure 12:
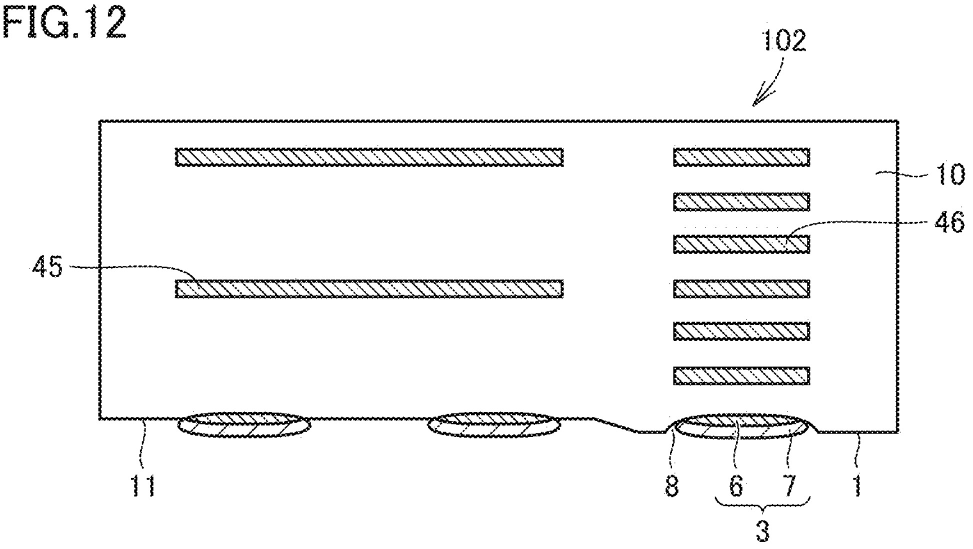
FIG. 12 is a cross-sectional view of an electronic component in a fourth embodiment based on the present disclosure.

Referring to FIG. 12, an electronic component in the fourth embodiment based on the present disclosure will be hereinafter described. FIG. 12 shows a cross-sectional view of an electronic component 102 in the present embodiment. Electronic component 102 includes internal electrodes 45 and 46 inside body 10. In a portion inside body 10 on the left side in the figure, a small number of internal electrodes 45 are disposed to overlap with each other while being spaced apart from each other. In a portion inside body 10 on the right side in the figure, a large number of internal electrodes 46 are disposed to overlap with each other while being spaced apart from each other. The lower surface of electronic component 102 is not flat due to the difference in number of the internal electrodes arranged in such a positional relation that the internal electrodes overlap with each other in the same region in this way. Specifically, in the projection area of electrode 46, the lower surface itself of electronic component 102 more protrudes than reference plane 11. In this area, electrode 3 is disposed inside recess 8.

In other words, first surface 1 has a first height region and a second height region that more protrudes than the first height region, and recess 8 is disposed in the second height region. In FIG. 12, the left region in which two electrodes are disposed is defined as the first height region, and the right region in which one electrode is disposed is defined as the second height region.

In the present embodiment, the second height region more protrudes than the first height region, and first surface 1 is not flat. However, since recess 8 is provided in the second height region, the height of the lower surface of electrode 3 including plating film 7 can be made substantially the same both in a first region and a second region. When the height of the lower surface of each electrode 3 is made the same in this way, a connection failure that may occur when mounting electronic component 102 can be suppressed. Please note that the first region and the second region are different concepts from the first height region and the second height region. Each of the first height region and the second height region is defined as part of first surface 1, while each of the first region and the second region is defined as part of the lower surface of electrodes 3 including plating films 7.

Figure 13:
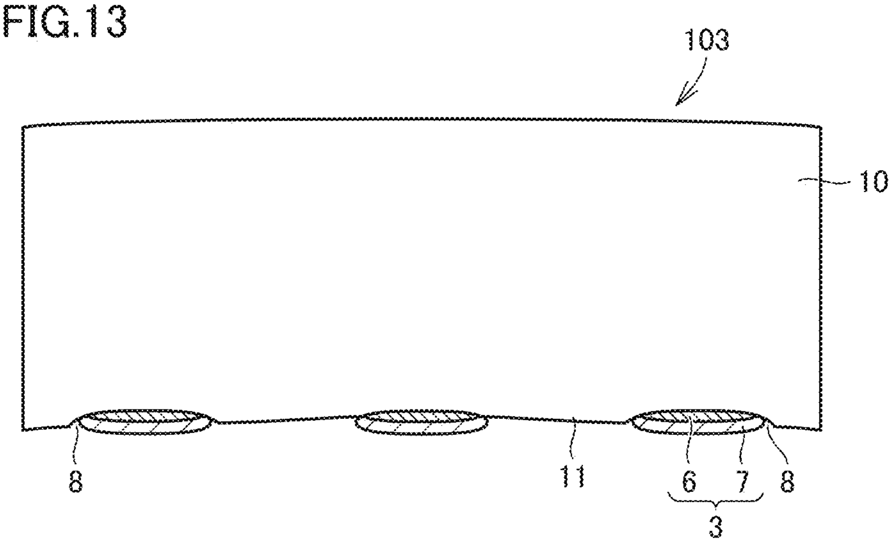
FIG. 13 is a cross-sectional view of a first modification of the electronic component in the fourth embodiment based on the present disclosure.

The concept regarding the first region and the second region described in the present embodiment is effective not only in the case where there is a difference in height appearing in first surface 1 due to the difference in number of the overlapping internal electrodes as described above, but also in the case where body 10 is warped. For example, as shown in FIG. 13, when body 10 is warped so as to protrude upward, the region in which center electrode 3 is disposed in FIG. 13 is recessed, and this region is regarded as the first height region. On the other hand, the regions in which electrodes 3 are disposed on the left and right ends relatively protrude, and these regions each are regarded as the second region. In the example shown in FIG. 13, each of electrodes 3 on the left and right ends in the second region is disposed inside recess 8. Thereby, the height of the lower surface of electrode 3 can be made substantially the same both in the first region and the second region.

Figure 14:
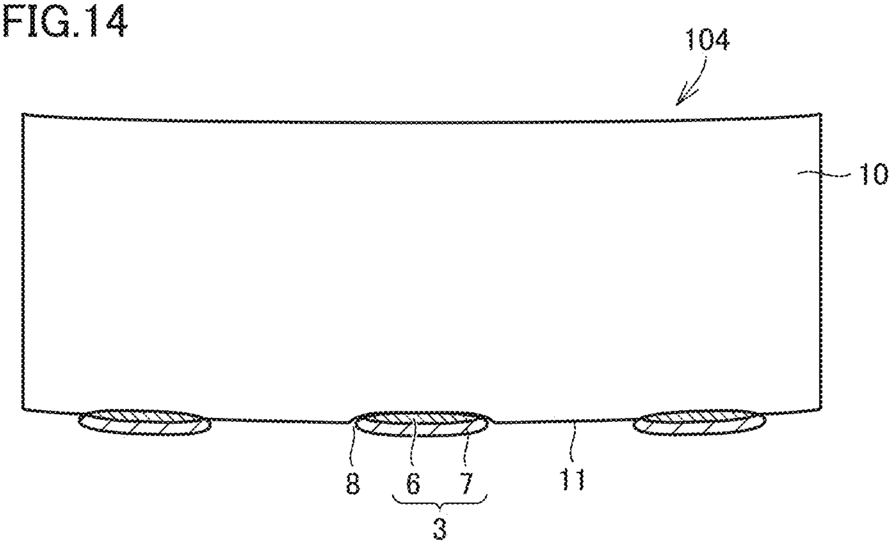
FIG. 14 is a cross-sectional view of a second modification of the electronic component in the fourth embodiment based on the present disclosure.

For example, as shown in FIG. 14, when body 10 is warped so as to protrude downward, the regions in which electrodes 3 are disposed on the left and right ends in FIG. 14 are recessed, and these regions each are regarded as the first height region. On the other hand, the region in which center electrode 3 is disposed relatively protrudes, and this region is regarded as the second region. In the example shown in FIG. 14, center electrode 3 in the second region is disposed inside recess 8. Thereby, the height of the lower surface of electrode 3 can be made substantially the same both in the first region and the second region.

As described above, in the case where first surface 1 exhibits a difference in height of the region provided with each electrode 3 for some reason, the same concept is applied to select whether or not to provide recess 8, and thereby, the height can be made the same to some extent.

Manufacturing Method

Referring to FIGS. 15 to 19, the following describes a method of forming a configuration in which electrode 3 is disposed inside recess 8.

Figure 15:
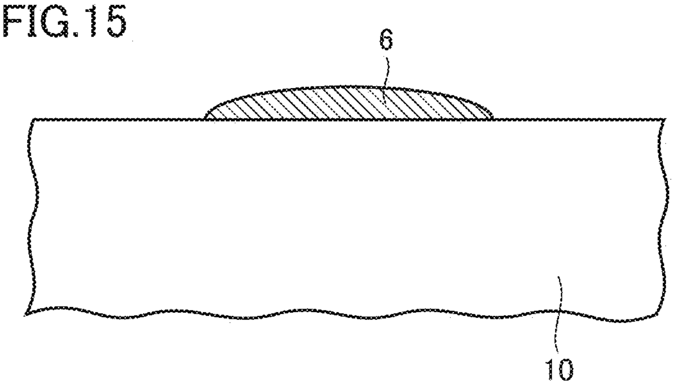
FIG. 15 is a first explanatory diagram of a method of forming a configuration in which an electrode is disposed inside a recess.
Figure 16:
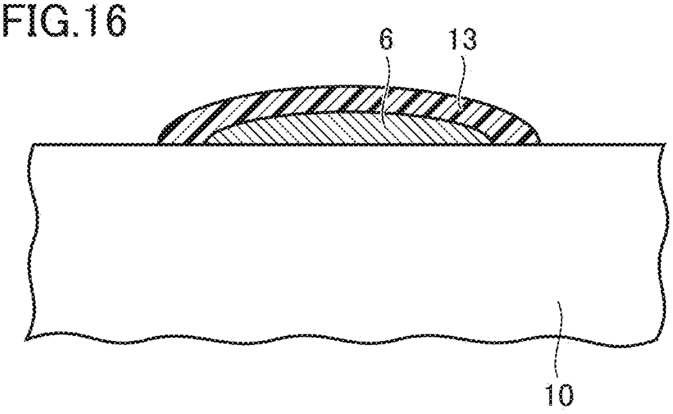
FIG. 16 is a second explanatory diagram of the method of forming the configuration in which the electrode is disposed inside the recess.
Figure 17:
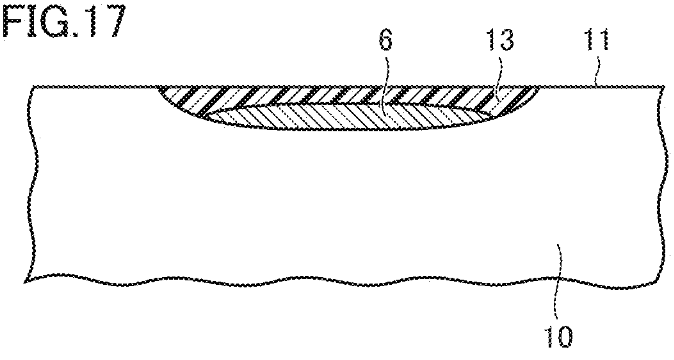
FIG. 17 is a third explanatory diagram of the method of forming the configuration in which the electrode is disposed inside the recess.
Figure 18:
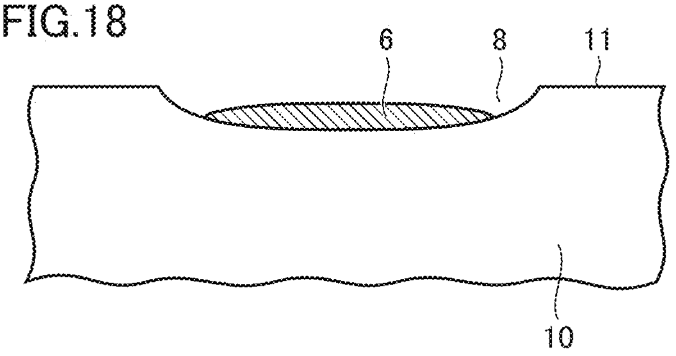
FIG. 18 is a fourth explanatory diagram of the method of forming the configuration in which the electrode is disposed inside the recess.
Figure 19:
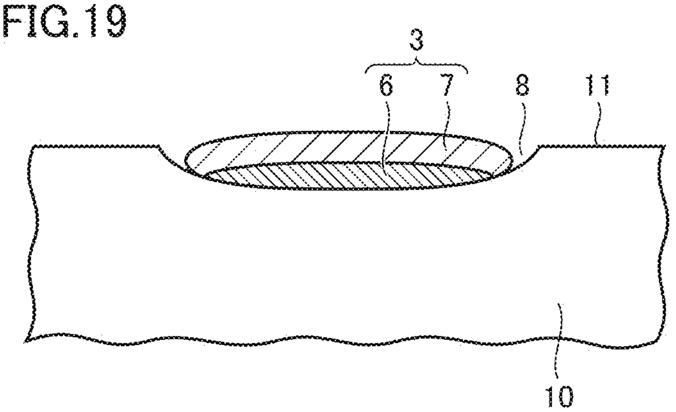
FIG. 19 is a fifth explanatory diagram of the method of forming the configuration in which the electrode is disposed inside the recess.

First, as shown in FIG. 15, base electrode 6 is formed by printing a conductive paste on a flat surface of body 10. The conductive paste used herein may be a Cu paste, for example. Then, as shown in FIG. 16, a resin paste is printed so as to cover base electrode 6. Thus, a resin paste layer 13 is formed. Then, press working is performed as shown in FIG. 17. In this way, base electrode 6 and resin paste layer 13 are pressed into the surface of body 10, and the surface of resin paste layer 13 is located to be almost flush with the reference plane of body 10. By performing firing in this state, resin paste layer 13 is burned, thus resulting in the state as shown in FIG. 18, which is specifically the state in which recess 8 is formed and base electrode 6 is disposed inside recess 8. Then, a plating treatment is performed. Thus, as shown in FIG. 19, plating film 7 grows based on base electrode 6. When plating film 7 grows sufficiently in the thickness direction, plating film 7 protrudes from recess 8 in the thickness direction.

In the region in which recess 8 is not to be provided, a plating treatment should only be performed starting from the state in which base electrode 6 is pressed into the surface of body 10 by press working.

Among the above-described embodiments, a plurality of embodiments may be employed in an appropriate combination.

Note that the above embodiments disclosed herein are illustrative and non-restrictive in every respect. The scope of the present disclosure is defined by the scope of the claims, and is intended to include any modifications within the meaning and scope equivalent to the scope of the claims.

1 first surface, 2 second surface, 3 electrode, 6 base electrode, 7 plating film, 8 recess, 10 body, 11 reference plane, 13 resin paste layer, 41 first internal electrode, 42 second internal electrode, 45, 46 internal electrode, 51, 52, 53, 54 region, 81, 82 portion, 101, 102, 103, 104 electronic component, 301 substrate, 301*a* surface, 310 electrode, 311 base electrode, 312 plating film.

The invention claimed is:

1. An electronic component comprising:

a body having a first surface;

a base electrode formed of metal and disposed on the first surface; and a plating film covering the base electrode, wherein the first surface has a reference plane and a recess more recessed than the reference plane, the base electrode is disposed inside the recess so that the base electrode does not protrude beyond the reference plane, the base electrode is disposed so as to cover a deepest part of the recess, a surface of the plating film being farthest from the body is flush with the reference plane or located at a position more protruding than the reference plane, when viewed from a direction perpendicular to the first surface, the base electrode is disposed inside the recess and spaced apart from an outer periphery of the recess, and when viewed from a direction perpendicular to the first surface, the plating film is disposed inside the recess and spaced apart from an outer periphery of the recess.

2. The electronic component according to claim 1, wherein a first internal electrode and a second internal electrode are disposed inside the body, at least a part of the first internal electrode is disposed within a projection area of the recess, the second internal electrode is disposed out of the projection area of the recess, and the second internal electrode is disposed closer to the reference plane than the first internal electrode.

3. The electronic component according to claim 1, wherein an outer edge portion of the recess is inclined with respect to the reference plane.

4. The electronic component according to claim 1, wherein a surface of the base electrode being farther from the body is flat or protrudes.

5. The electronic component according to claim 1, wherein the first surface has a first height region and a second height region more protruding than the first height region, and the recess is provided in the second height region.

6. The electronic component according to claim 1, wherein the recess is provided to extend to an end of the first surface.

7. The electronic component according to claim 2, wherein an outer edge portion of the recess is inclined with respect to the reference plane.

8. The electronic component according to claim 2, wherein a surface of the base electrode being farther from the body is flat or protrudes.

9. The electronic component according to claim 3, wherein a surface of the base electrode being farther from the body is flat or protrudes.

10. The electronic component according to claim 2, wherein the first surface has a first height region and a second height region more protruding than the first height region, and the recess is provided in the second height region.

11. The electronic component according to claim 3, wherein the first surface has a first height region and a second height region more protruding than the first height region, and the recess is provided in the second height region.

12. The electronic component according to claim 4, wherein the first surface has a first height region and a second height region more protruding than the first height region, and the recess is provided in the second height region.

* * * * *